March 15, 1966   J. A. O. SLOAN   3,240,096
PNEUMATIC DRUM AND BANJO HEAD TIGHTENERS
Filed Aug. 16, 1963   3 Sheets-Sheet 1
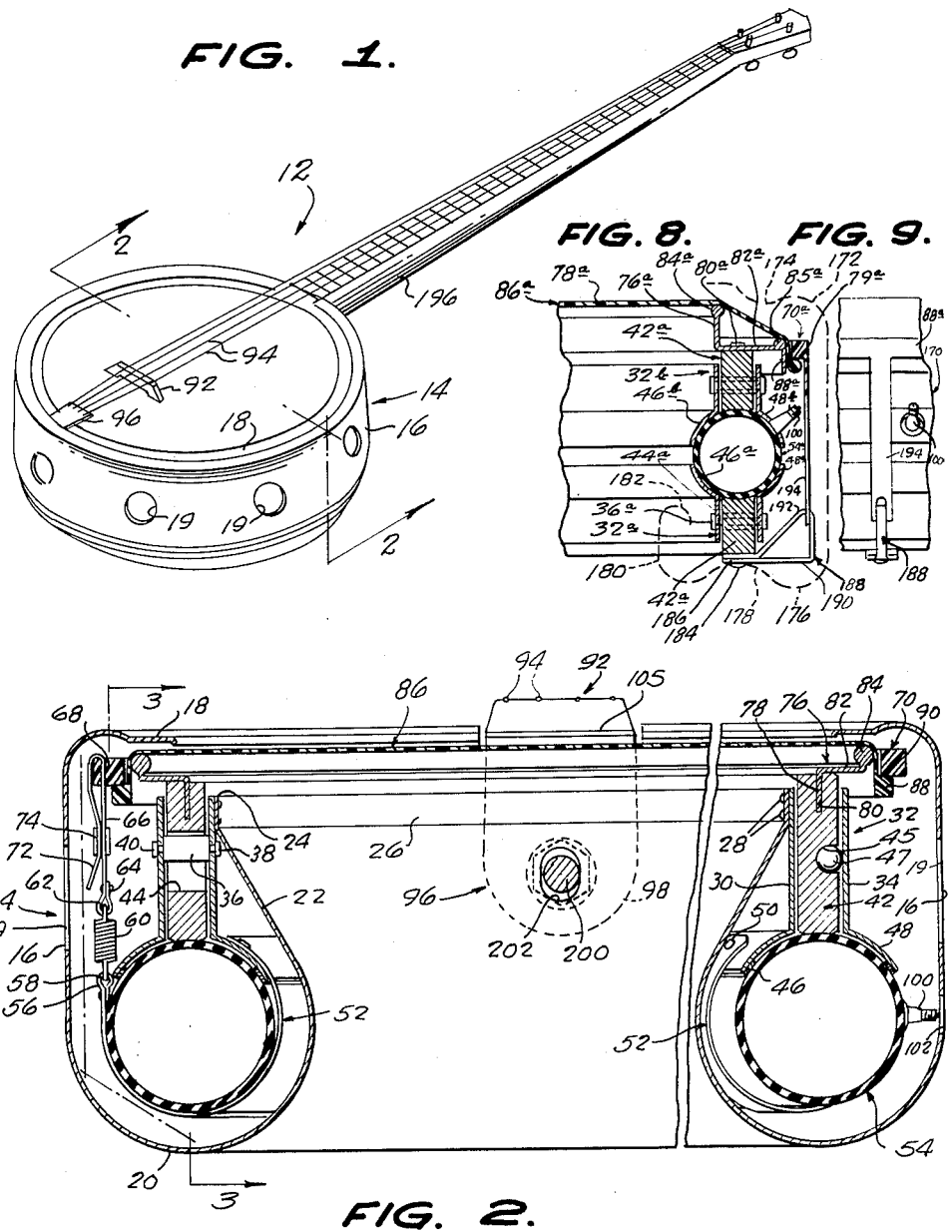
INVENTOR.
JOHN A. O. SLOAN,
BY
McMorrow, Berman + Davidson
ATTORNEYS.

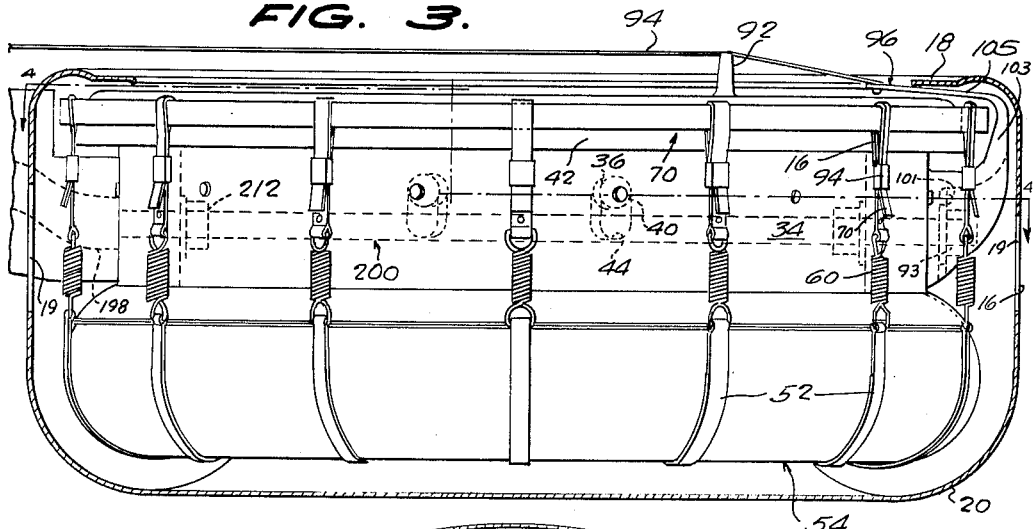
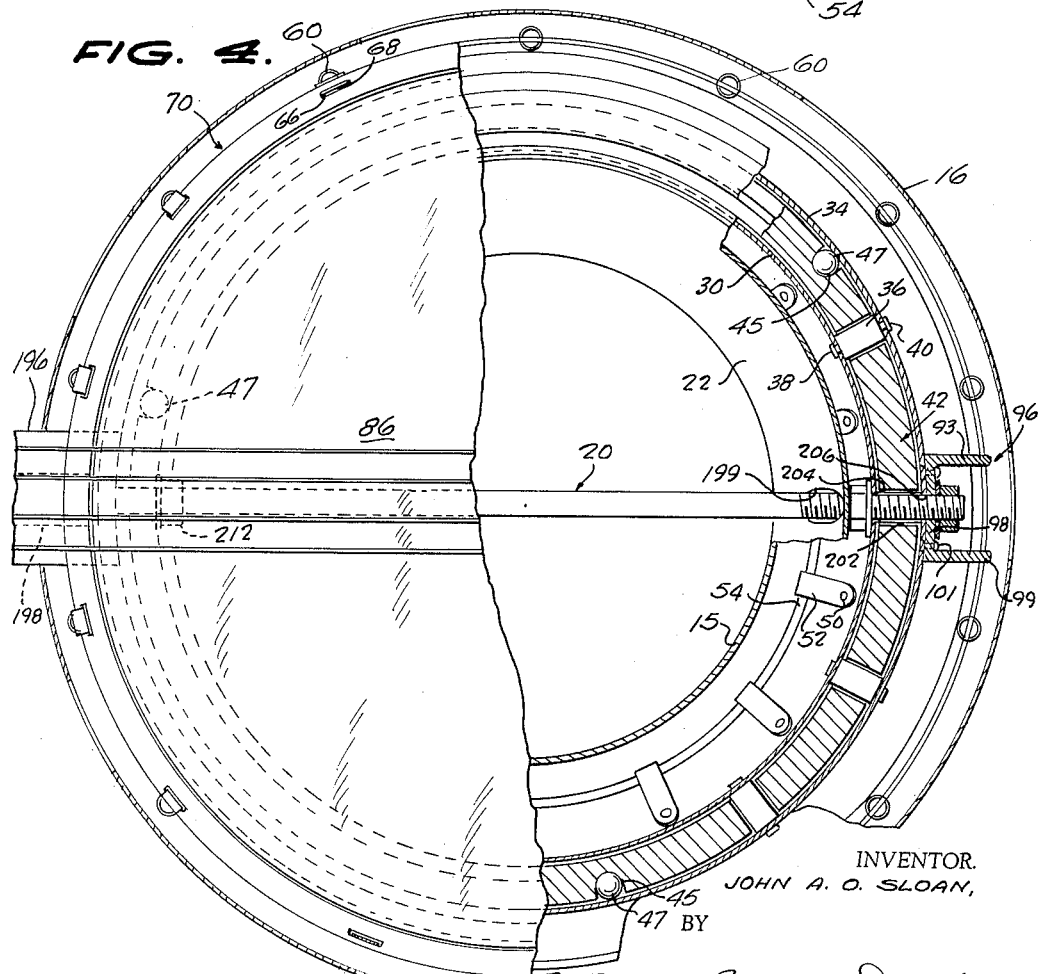

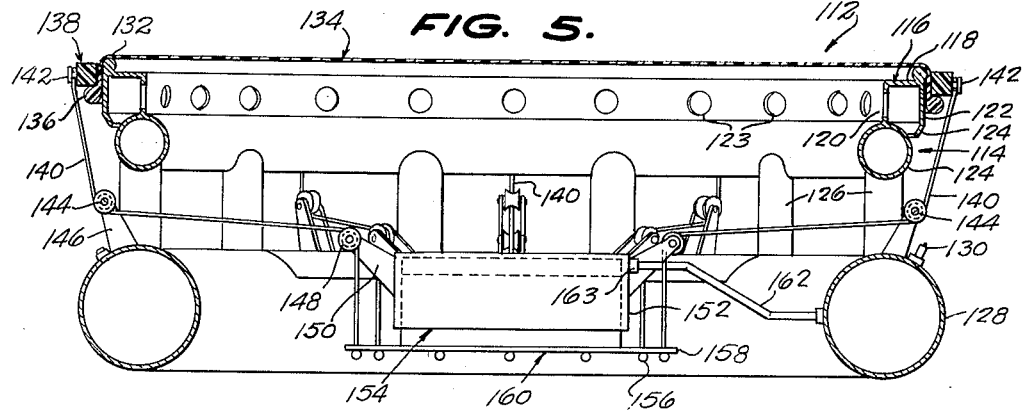
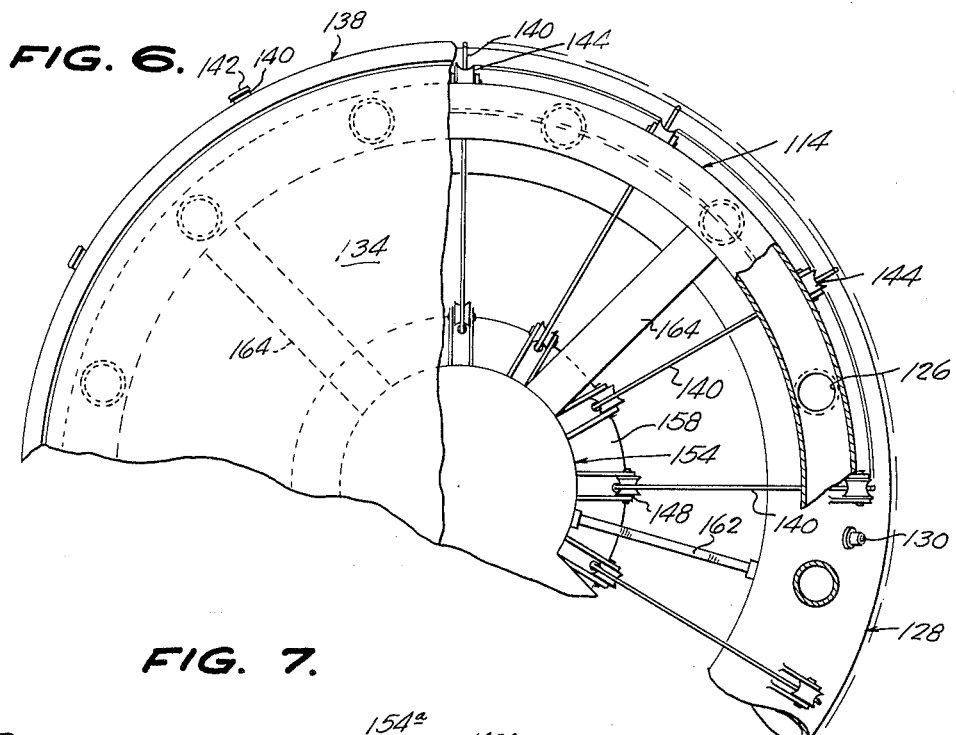
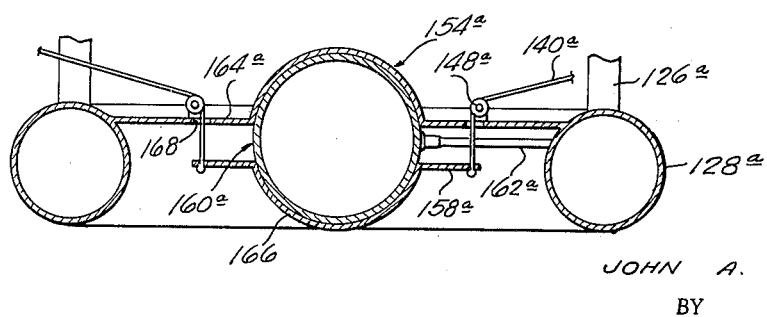

United States Patent Office 3,240,096
Patented Mar. 15, 1966

3,240,096
PNEUMATIC DRUM AND BANJO HEAD TIGHTENERS
John A. O. Sloan, 273 Maple Ave., South Chicago Heights, Ill.
Filed Aug. 16, 1963, Ser. No. 302,617
20 Claims. (Cl. 84—272)

This invention relates to novel pneumatic drum and banjo head tighteners.

The primary object of the invention is the provision of devices of the kind indicated which are more practical, more efficient, and more readily installed and adjusted, and which, once properly adjusted, have automatic compensations for differences in the tautness of heads produced by changes in temperature and humidity.

Another object of the invention is the provision of devices of the character indicated above, which enhance the "bounce," tonal production, sound volume, and response of heads, through disassociation of the devices from the casings of drums or banjos, and through the transmission of vibrations of the heads to the resonant interiors of hollow members within the casings.

Other important objects and advantageous features of the invention will be apparent from the following description and the accompanying drawings, wherein, for purposes of illustration only, a specific form of the invention is set forth in detail.

In the drawings;

FIGURE 1 is a perspective view of a banjo incorporating a device of the present invention;

FIGURE 2 is an enlarged and contracted vertical transverse section taken on the line 2—2 of FIGURE 1;

FIGURE 3 is a vertical transverse section taken on the line 3—3 of FIGURE 2;

FIGURE 4 is a fragmentary horizontal section taken on the line 4—4 of FIGURE 3;

FIGURE 5 is a central vertical transverse section taken through a drum incorporating another device of the present invention;

FIGURE 6 is a fragmentary top plan view of FIGURE 5, partly broken away and in section;

FIGURE 7 is a fragmentary vertical transverse section taken through a further form of device for a drum;

FIGURE 8 is a fragmentary vertical transverse section taken through a still further device of the present invention;

FIGURE 9 is a side elevation of FIGURE 8.

Referring in detail to the drawings, and first to FIGURES 1 to 4, the numeral 12 generally designates a banjo having a hollow annular casing 14 having an open bottom 15. The casing 14 has a side wall which comprises a flat perpendicular portion 16 which has, on its upper edge, a radially inwardly extending annular flange 18. The portion 16 merges, at its lower end, into an inwardly extending annular, semi-cylindrical upwardly opening portion 20 of substantial diameter, which terminates in a flat upwardly extending tangential portion 22. The flat portion 22 slants upwardly and outwardly, at an acute angle, toward the straight side wall 16, and its upper edge 24 is substantially spaced inwardly from side wall portion 16, and is spaced, at a substantial distance downwardly from the flange 18. The side wall portion 16 is formed with relatively large diameter sound releasing holes 19 spaced at equal substantial distances therearound.

A horizontal support ring 26 engages and is fixed, as by means of rivets 28, to the upper part of the flat casing wall portion 22. The rivets 28 also serve to fix to the outer side of the ring 26, the inner wall 30 of an annular housing 32, having an outer wall 34 parallel spaced from the inner wall 30. A plurality of equally circumferentially spaced spacer blocks 36 extend between the housing walls 30 and 34, and are fixed thereto, as indicated at 38 and 40, respectively.

A preferably wooden, vertically elongated vibrator ring 42 is loosely engaged between the housing walls 30 and 34, and, as shown in FIGURE 2, is formed with vertically elongated slots 44, taller than and receiving the spacer blocks 36, relative to which the vibrator ring 42 is vertically movable. The outer surface of the ring 42 is formed, at preferably three equally spaced locations, with concave recesses 45, in which are seated balls 47, which extend outwardly and engage the outer housing wall 34, to prevent contact of the ring therewith.

The inner housing wall 30 has, on its lower edge, an inwardly and downwardly curved flange 46, and the outer housing wall 34 has a similar outwardly and downwardly curved flange 48, these flanges having the same center of curvature.

Secured, as indicated at 50, at their upper ends, is a plurality of equally circumferentially spaced vertical flexible lower strap sections 52, preferably of nylon or the equivalent, this material being chosen because of its desired limited stretchability, under tension, which provides automatic compensation for changes in tautness of the drum head skin or vellum, to which they are attached, produced by changes in temperature and humidity. This compensation prevents splitting of the vellum under such conditions. The straps should be as light as feasible.

The lower strap sections 52 extend outwardly around the lower side of an annular tubular vellum 54 which is suitably secured to and symmetrically positioned between the flanges 46 and 48, of the housing walls 30 and 34, respectively. The strap sections 52 terminate, at the upper outer side of the vellum 54, where they have loops 56, through which the lower hooks 58 of coil springs 60 are engaged. Upper hooks 62, on the springs 60, are engaged through loops 64, on the lower ends of upper strap sections 66.

The upper strap sections 66 are passed upwardly through vertical slots 68, equally spaced around a brass or aluminum pull-down ring 70, the ends 72 thereof being then brought outwardly and downwardly and passed securably through cinch rings 74 embracing the upper strap sections.

A preferably brass tone ring 76 comprises a vertical pendant portion 78, set securably into the upper ends of the vibrator rings 44, as indicated at 80, and an outwardly extending horizontal portion 82, which reaches outwardly beyond the housing 32. An annular cylindrical upstanding bead 84 is fixed on the portion 82, at its outer edge.

A circular drum head vellum 86 is larger in diameter than and is stretched across the tone ring 76, and has, on its peripheral edge, which is pendant around the bead 84, an outwardly extending rectangular cross section rib 88, having a flat upper surface 90, upon which the pull-down ring 70 bears. The annular vellum 54 must be such that it can be stretched as tight as the head vellum 86, under air pressure.

The regular bridge 92 of the banjo 12 bears upon the upper surface of the vellum 86, and the banjo strings 94 rest thereon and are secured to a tail-piece 96, which, as shown in FIGURES 3 and 4, comprises a vertical channel lower portion 98, having a web 99 and side walls 99'. The web 99 bears against the outer surface of the housing wall 34, to which it is fixed, as by rivets 101. The outer part of the lower portion 98 merges into an upwardly extending arm 103, which terminates in a radially inwardly extending and upwardly angled flat terminal 105, to which the strings 94 are secured.

As shown in FIGURE 2, the vibrator ring 42 rests freely upon the top of the annular vellum tube 54, so that it is free to bounce thereon, in response to tonal vibrations imposed upon the head vellum 86, through the tone ring 76, from the bridge 92, the tail-piece 96, and the strings 94.

The neck 196 of the banjo has securably inserted, in its inner end, as shown in FIGURES 3 and 4, an upwardly offset terminal portion 198 of a rod 200, which extends diametrically across the casing 14, and has a threaded terminal 201 extending spacedly through an opening 199 in the flat tangential portion 22, and openings 202 in the vibrator ring 42, and closely through openings 204 and 206 in the housing walls 32 and 34, respectively, and through an opening 208, in the web 99 of the tail-piece 96. A washer 210 is circumposed on the threaded terminal 201, against the outer side of the web 99, and a nut 212 is threaded on the terminal against the washer. This draws the squared end 214 of the neck 196 against the outer surface of the outer housing wall 34. Another nut 216 is threaded on the rod 200 against the inner housing wall 34, at the opposite end of the rod.

In operation, the straps are equally tightened, the annular vellum having been inflated, as by applying a pump or other source of air under pressure, to such as vehicle tire valves 100, secured in the outer side of the tube, access to the valves being afforded by openings 102 in the banjo casing side wall portion 16.

The hollow resonant character of the chamber 104 constituted by the side wall of the banjo casing 12, the free movements of the vibrator ring 42, and the hollowness of the annular vellum 54, picking of the banjo strings 94 produces with greater and easier response, louder, clearer, and better defined tones, which escape freely through the open bottom 15 of the casing 12 and the casing side wall openings 19.

FIGURES 5 and 6 of the drawings show a drum 112 incorporating another pneumatic drum head or vellum tightener device of the present invention. The drum 112 comprises an annular open-bottom casing 114 comprising an annular downwardly opening metal channel tone ring 116 having a horizontal imperforate web 118, a pendant perpendicular inner wall 120, and a pendant perpendicular outer wall 122, having, on its lower end, a short inwardly and downwardly angled flange 124. The inner wall 120 is formed with a plurality of equally spaced round sound holes 123.

A structure corresponding in function to the vibrator ring 42 of FIGURES 1 to 4, comprises an imperforate annular metal upper tube 124 which is fixed radially to the lower end of the inner wall 120 of the tone ring 116. A plurality of vertical, equally circumferentially spaced tubes 126 are fixed, in communication with the lower side of the upper tube 124, and fixed, in communication with the upper side of an annular metal lower tube 128. The lower tube 128 is larger in diameter than the upper tube 124 and is vertically aligned therewith. Suitable valves 130 are provided on the lower tube 128 to provide for the introduction of air under pressure into the lower tube 128, the vertical tubes 126, and the upper tube 124. The lower tube 128 corresponds in function to the annular vellum 54 of FIGURES 1 to 4.

A cylindrical bead 132 is fixed upon the web 118 of the tone ring 116, at the outer edge thereof, and a vellum 134, larger in diameter than the bead 132 is stretched thereacross and hangs down therearound. The vellum 134 has an outwardly extending rib 136, around its peripheral edge, upon which rests a pull-down ring 138. Cords 140, preferably of nylon or material of like characteristics, unaffected by atmospheric conditions but capable of limited stretching to compensate for changes in the tautness of the vellum due to changes in temperature and humidity, are secured, as indicated at 142, at their upper ends to the outer side of the pull-down ring 138.

The cords 140 are equally circumferentially spaced around the pull-down ring 138 and pass downwardly and radially inwardly under outer pulleys 144 on the upper ends of outwardly inclined brackets 146 fixed on the top of the lower tube 128, and are trained over inner pulleys 148, on the upper ends of outwardly inclined brackets 150, fixed to the side wall 152 of a cylindrical housing 154.

The inner ends of the cords 140 are secured, as indicated at 156, to an annular horizontal annular flange 158 which is fixed to the lower end of a cylindrical piston 160 which works in the housing 154. An air pipe 162 leads from the lower casing tube 128 and is connected, through the housing sidewall 152, as indicated at 163, at a point above the piston 160.

The piston housing 154 is fixedly supported substantially on a level with the lower casing tube 128, by means of a plurality of equally circumferentially spaced horizontal radial struts 164, which are suitably fixed, at related ends, to the housing and the lower tube 128.

In operation, introduction of air under pressure into the casing 12 causes the piston 160 to be forced downwardly out of the housing 154, whereby the cords 140 are equally tensioned and pull down the pull-down ring, so as to evenly tighten and tension the vellum 134.

FIGURE 7 shows a variation of the device of FIGURES 5 and 6, but is otherwise the same in construction. In FIGURE 7, the piston housing 154 and the piston 160 are replaced by a hemispherical housing 154a, mounted on struts 164a, in which the upper half of resilient and expandible piston sphere 160a is secured, and connected to the lower casing tube 128a by means of an air pipe 162a. A hemispherical metal member 166 receives the lower part of the piston sphere 160a and has therearound a horizontal flange 158a to which the cords 140a are secured. The inner pulleys 148a are mounted on the struts 164a and pass downwardly to the flange 158a through holes 168 formed in the struts.

In FIGURES 8 and 9 is shown still another form of device of the present invention, which is adapted for incorporation in either a drum or a banjo, or other musical instrument involving a taut vellum or the equivalent thereof. The instrument shown comprises an annular metal casing 170 having a sidewall 172, on whose upper edge is an inwardly extending annular flange 174. On its lower end, the sidewall 172 merges into an inwardly extending annular flange which is composed of a downwardly bowed outer portion 176, an upwardly bowed intermediate portion 178, and a flat perpendicular upstanding inner portion 180, which terminates in an upwardly bowed outwardly extending flange 182.

A lower wooden vibrator ring 42a, generally similar to vibrator ring 42 of FIGURES 1 to 4, is fixed, at its lower edge, as indicated at 184, upon the inner end portion 186 of a plurality of equally circumferentially spaced outwardly extending brackets 188 and to the intermediate portion 178 of the casing. The brackets 188 include right-triangular loops 190, through whose apices 192 are looped the lower ends of nylon or other suitable material cords or straps 194, which are fixed, at their upper ends to a metal pull-down ring 70a.

The upper part of the lower vibrator ring 42a is slidably engaged in a lower annular housing 32a, generally similar to that of FIGURES 1 to 4, and is formed with slots 44a, loosely receiving spacers 36a, secured across the housing 32a. The housing 32a has inner and outer walls, which have concentric arcuate flanges 46a and 46b, respectively, on which is seated the lower part of a resilient and expandible tubular annular vellum 54a, which bears also upon the upper end of the lower vibrator ring 42a. An inflating valve 100a is provided on the vellum 54a.

Bearing upon the top of the vellum 54a are the arcuate flanges 46b and 48b of an upper annular housing 32b, between whose walls works an upper vibrator ring 42b, whose lower end bears freely upon the vellum 54a. The upper ring 42b extends above its housing and is secured, as indicated at 80a, to a tone ring 76a.

The tone ring 76a is L-shaped and comprises a flat horizontal portion 82a and an upstanding portion 78a, on the inner edge of the portion 82a, which has a first cylindrical bead 84a around its upper edge. A second upstanding cylindrical bead 85a is on the outer edge of the horizontal portion 82a. A short pendant annular flange 79a is on the outer edge of the horizontal portion 82a.

A head vellum 86a, larger in diameter than the tone ring 76a is stretched thereover and hangs over its edge, where it is provided with an outstanding rib 88a, upon which the pull-down ring 70a bears.

In operation, inflation of the piston tube 54a increases the distance between the tone ring 76a and the cord brackets 188, so that the cords are tensioned and pull the pull-down ring downwardly and tighten the vellum 86a.

Although there have been shown and described preferred forms of the invention, it is to be understood that the invention is not necessarily confined thereto, and that any change of changes in the structure of and in the relative arrangements of components thereof are contemplated as being within the scope of the invention as defined by the claims appended hereto.

What is claimed is:

1. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the operating means and the pull-down ring, and means for moving the vertically acting means to tighten the cord means.

2. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the operating means and the pull-down ring, and means for moving the vertically acting means to tighten the cord means, said instrument further comprising a bridge bearing upon the head vellum, tensioned strings bearing upon the bridge, said strings terminating in a tail-piece fixed to said casing.

3. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means to tighten the cord means, said vertically acting means comprising expandible pneumatic means.

4. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means movably engaged in the housing means and connected to the tone ring, and resilient and expandible tubular vellum means supported in engagement with the piston means, and means for inflating the annular vellum, said cord means being wrapped around the vellum means and secured at one end thereto.

5. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said casing comprising an upper annular tube beneath and fixed to the tone ring, a lower annular tube spaced beneath and concentric with the upper tube, circumferentially spaced vertical tubes extending between and providing communication between the upper and lower tubes, strut means fixed to and extending inwardly from the lower tube, said vertically acting means comprising a cylindrical piston housing mounted on the strut means at the center of the lower casing tube, a piston working in the piston housing through the lower end, said cord means being connected to the piston, means providing communication between the casing and the piston housing, and means for introducing air under pressure into the casing for depressing the piston relative to its housing and tensioning the cord means for pulling the pull-down ring downwardly and tightening the vellum.

6. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said casing comprising an upper annular tube beneath and fixed to the tone ring, a lower annular tube spaced between and concentric with the upper tube, circumferentially spaced vertical tubes extending between and providing communication between the upper and lower tubes, strut means fixed to and extending inwardly from the lower tube, said vertically acting means comprising a central hemispherical housing on the strut means, a resilient and expandible sphere having an upper portion seated in the housing, a hemispherical member receiving the lower part of the sphere, said cord means being connected to said hemispherical member.

7. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving vertically acting means to tighten the cord means, said vertically acting means comprising an upper vibrator ring beneath and fixed to the tone ring, an upper annular housing in which the upper vibrator ring is confined for limited vertical movement, a lower annular vibrator ring spaced below and in line with the upper vibrator ring, a lower annular housing spaced below and in line with the upper housing, said lower vibrator ring being confined in the lower housing for limited vertical movement relative thereto, outwardly extending bracket means fixed to the lower edge of the lower vibrator ring to which said said cord means is secured, a resilient and expandible annular tubular vellum supported between the upper and lower housings and freely engaged with the adjacent edges of the upper and lower vibrator rings, and means for inflating the annular vellum.

8. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means movably engaged in the housing means and connected to the tone ring, and resilient and expandible annular tubular vellum means supported in engagement with the piston means, and means for inflating the annular vellum means, said cord means being wrapped around the annular vellum means and secured at one end thereto, said casing comprising a side wall having a perpenedicular upper portion having an inwardly extending annular flange on its upper edge, said upper portion merging at its lower edge into an upwardly opening semi-cylindrical lower portion, said lower portion spacedly surrounding the annular vellum means, said lower portion terminating in an upstanding portion extending to the upper end of and fixed to the inner side of the housing.

9. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means slidably engaged in the housing means and connected to the tone ring, and resilient and expandible annular tubular vellum means supported in engagement with the vibrator means, and means for inflating the annular vellum, said cord means being wrapped around the annular vellum and secured at one end thereto, said casing comprising a side wall having a perpenedicular upper portion having an inwardly extending annular flange on its upper edge, said upper portion merging at its lower edge into an upwardly opening semi-cylindrical lower portion, said lower portion spacedly surrounding the annular vellum means, said lower portion terminating in an upstanding portion extending to the upper end of and fixed to the inner side of the piston housing, said instrument further comprising a bridge bearing upon the head vellum, tensioned strings bearing upon the bridge, said strings terminating in a tail-piece secured to the annular housing means.

10. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means movably engaged in the housing means and connected to the tone ring, and resilient and expandible annular tubular vellum means supported in engagement with the vibrator means, and means for inflating the annular vellum means, said cord means being wrapped around the annular vellum means and secured at one end thereto, said cord means comprising a lower strap section embracing the underside of the annular vellum means and having an upper end at the outer side of the annular vellum means, a coil spring connected at its lower end to the upper end of the lower strap section, an upper strap section connected at its lower end to the upper end of the spring, said pull-down ring having a vertical slot through which the upper strap section is passed, a cinch ring on the upper strap section beneath the pull-down ring, said upper strap section having an end portion passed downwardly and securably through the cinch ring.

11. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means slidably engaged in the housing means and connected to the tone ring, and resilient and expandible annular tubular vellum means supported in engagement with the vibrator means, and means for inflating the annular vellum means, said cord means being wrapped around the annular vellum means and secured at one end thereto, said tone ring having upstanding bead means upon which the head vellum bears, said tone ring comprising a pendant vertical portion received in the upper edge of the vibrator ring means, and an outwardly extending horizontal portion carrying the bead means.

12. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanading rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said vertically acting means comprising annular housing means having concentrically spaced inner and outer vertical walls, annular vibrator means movably engaged in the housing means and connected to the tone ring, and resilient and expandible annular tubular vellum means supported in engagement with the vibrator means, and means for inflating the annular vellum means, said cord means being wrapped around the annular vellum means and secured at one end thereto, said tone ring having upstanding bead means upon which the vellum bears, said tone ring being L-shaped and having a vertical portion and a horizontal portion extending outwardly from the lower end of the vertical portion, said bead means comprising a first bead on the upper edge of said vertical tone ring portion and a second bead upstanding on the horizontal portion at the outer edge thereof.

13. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vibrator means to tighten the cord means, said casing comprising an upper annular tube beneath and fixed to the tone ring, a lower annular tube spaced beneath and concentric with the upper tube, circumferentially spaced vertical tubes extending between and providing communication between the upper and lower tubes, strut means fixed to and extending inwardly from the lower tube, said vertically acting means comprising a cylindrical housing mounted on the strut means at the center of the lower casing tube, a vibrator working in the housing through its lower end, said cord means being connected to the vibrator, means providing communication between the casing and the housing, and means for introducing air under pressure into the casing for depressing the piston relative to its housing and tensioning the cord means for pulling the pull-down ring downwardly and tightening the head vellum, said tone ring comprising a downwardly facing annular channel having a web and pendant inner and outer vertical walls, said upper tube being fixed to the lower edge of the inner wall, the outer wall being laterally outwardly spaced from the upper tube.

14. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said casing comprising an upper annular tube beneath and fixed to the tone ring, a lower annular tube spaced beneath and concentric with the upper tube, circumferentially spaced vertical tubes extending between and providing communication between the upper and lower tubes, strut means fixed to and extending inwardly from the lower tube, said vertically acting means comprising a cylindrical housing mounted on the strut means at the center of the lower casing tube, a piston working in the piston housing through its lower end, said cord means being connected to the piston, means providing communication between the casing and the piston housing, and means for introducing air under pressure into the casing for depressing the piston relative to its housing and tensioning the cord means for pulling the pull-down ring downwardly and tightening the vellum, said tone ring comprising a downwardly facing annular channel having a web and pendant inner and outer vertical walls, said upper tube being fixed to the lower edge of the inner wall, the outer wall being laterally outwardly spaced from the upper tube, said inner wall being formed with circumferentially spaced sound holes, and said outer wall being imperforate.

15. A musical instrument having a substantially annular casing, an annular tone ring mounted on the upper end of the casing, a head vellum stretched across the tone ring, said vellum being larger in diameter than the tone ring and having a peripheral edge portion pendant around the tone ring, said tone ring having upstanding bead means upon which the vellum supportably bears, an outstanding rib on the peripheral edge of the vellum, a pull-down ring surrounding the pendant portion of the vellum and bearing downwardly upon said rib, vertically acting means carried by the casing, cord means extending between and operatively connected to the vertically acting means and the pull-down ring, and means for moving the vertically acting means to tighten the cord means, said casing comprising an upper annular tube beneath and fixed to the tone ring, a lower annular tube spaced beneath and concentric with the upper tube, circumferentially spaced vertical tubes extending between and providing communication between the upper and lower tubes, strut means fixed to and extending inwardly from the lower tube, said vertically acting means comprising a cylindrical housing mounted on the strut means at the center of the lower casing tube, a piston working in the housing through its lower end, said cord means being connected to the piston, means providing communication between the casing and the housing, and means for introducing air under pressure into the casing for depressing the piston relative to its housing and tensioning the cord means for pulling the pull-down ring downwardly and tightening the vellum, inner pulleys on the sidewall of the piston housing, outer pulleys upstanding on the lower tube, said cord means being trained under the outer pulleys and over the inner pulleys.

16. A musical instrument comprising a casing having a side wall, a substantially annular tone ring positioned spacedly within the upper end of the casing, a head vellum extending across the tone ring, said head vellum being larger in diameter than the tone ring and having a peripheral edge portion pendant around the ring, a pull-down ring securably engaged with said peripheral portion of the head vellum, vertically acting means connected at its upper end to the pull-down ring, an annular housing spaced below the head vellum and spaced from the side wall of the casing, said housing having open upper and lower ends and inner and outer side walls, an annular vibrator ring positioned within the housing for vertical movements relative thereto, the tone ring being fixed to the upper end of the vibrator ring, said casing side wall terminating at its lower end in an upwardly opening concave portion which merges into an upwardly extending portion which is fixed to the inner wall of the annular housing, the side walls of the housing having lateral flanges at their lower ends, an inflatable and resilient annular tubular vellum positioned beneath the annular housing and spacedly within said concave casing side wall portion, said annular vellum being partially engaged at its top with said annular flanges and with the lower edge of the vibrator ring, said pull-down means being operatively engaged with the bottom of and secured to the annular vellum.

17. A musical instrument comprising a casing having a side wall, a substantially annular tone ring positioned spacedly within the upper end of the casing, a head vellum extending across the tone ring, said head vellum being larger in diameter than the tone ring and having a peripheral edge portion pendant around the ring, a pull-down ring securably engaged with said peripheral portion of the head vellum, vertically acting means connected at its upper end to the pull-down ring, an annular housing spaced below the head vellum and spaced from the side wall of the casing, said housing having open upper and lower ends and inner and outer side walls, an annular vibrator ring positioned within the housing for vertical movements relative thereto, the tone ring being fixed to the upper end of the vibrator ring, said casing sidewall terminating at its lower end in an upwardly opening concave portion which merges into an upwardly extending portion which is fixed to the inner wall of the annular housing, the side walls of the housing having lateral flanges at their lower ends, an inflatable and resilient annular tubular vellum positioned beneath the annular housing and spacedly within said concave casing side wall portion, said annular vellum being partially engaged at its top with said annular flanges and with the lower edge of the vibrator ring, said pull-down means being operatively engaged with the bottom of and secured to the annular vellum, the outer surface of the vibrator ring being formed with circumferentially spaced recesses, balls seated in said recesses and extending thereto and engaged with the inner surface of the outer housing side wall.

18. A musical instrument comprising a casing having a side wall, a substantially annular tone ring positioned spacedly within the upper end of the casing, a head vellum extending across the tone ring, said head vellum being larger in diameter than the tone ring and having a peripheral edge portion pendant around the ring, a pull-down ring securably engaged with said pendant portion of the head vellum, vertically acting means connected at its upper end to the pull-down ring, an annular housing spaced below the head vellum and spaced from the side wall of the casing, said housing having open upper and lower ends and inner and outer side walls, an annular vibrator ring positioned within the housing for vertical movements relative thereto, the tone ring being fixed to the upper end of the vibrator ring, said casing sidewall terminating at its lower end in an upwardly opening concave portion which merges into an upwardly extending portion which is fixed to the inner wall of the annular housing, the side walls of the housing having lateral flanges at their lower ends, an inflatable and resilient annular tubular vellum positioned beneath the annular housing and spacedly within said concave casing side wall portion, said annular vellum being partially engaged at its top with said annular flanges and with the lower edge of the vibrator ring, said pull-down means being operatively engaged with the bottom of and secured to the annular vellum, a neck having an inner end abutting the outer side of the outer side wall of the annular housing, said housing side walls, the casing side wall, the vibrator ring, and said tangential portion of the casing being formed with aligned openings, a rod extending diametrically across the casing and through said openings and secured to outside housing side wall at the end thereof remote from the neck, said rod being out of contact with the vibrator ring, said rod having a terminal extending out of the casing and secured in the neck.

19. A musical instrument comprising a casing having a side wall, a substantially annular tone ring positioned spacedly within the upper end of the casing, a head vellum extending across the tone ring, said head vellum being larger in diameter than the tone ring and having a peripheral edge portion pendant around the ring, a pull-down ring securably engaged with said peripheral portion of the head vellum, vertically acting means connected at its upper end to the pull-down ring, an annular housing spaced below the head vellum and spaced from the side wall of the casing, said housing having open upper and lower ends and inner and outer side walls, an annular vibrator ring positioned within the housing for vertical movements relative thereto, the tone ring being fixed to the upper end of the vibrator ring, said casing sidewall terminating at its lower end in an upwardly opening concave portion which merges into an upwardly extending portion which is fixed to the inner wall of the annular housing, the side walls of the housing having lateral flanges at their lower ends, an inflatable and resilient annular tubular vellum positioned beneath the annular housing and spacedly within said concave casing side wall portion, said annular vellum being partially engaged at its top with said annular flanges and with the lower edge of the vibrator ring, said pull-down means being operatively engaged with the bottom of and secured to the annular vellum, a neck having an inner end abutting the outer side of the outer side wall of the annular housing, said housing side walls, the casing side wall, the vibrator ring, and said tangential portion of the casing being formed with aligned openings, a rod extending diametrically across the casing and through said openings and secured to outside housing side wall at the end thereof remote from the neck, said rod being out of contact with the vibrator ring, said rod having a terminal extending out of the casing and secured in the neck, a tail-piece bearing against the outer surface of the annular housing and secured thereto and to the rod, said tail-piece having an upstanding arm spaced from the casing side wall and the housing and merging into an inwardly extending terminal spaced from the housing side wall and the hold-down ring, a bridge bearing upon the head vellum, and strings secured to the neck and the terminal of the tail-piece and bearing upon the bridge.

20. A musical instrument comprising a casing having a side wall, a substantially annular tone ring positioned spacedly within the upper end of the casing, a head vellum extending across the tone ring, said head vellum being larger in diameter than the tone ring and having a peripheral edge portion pendant around the ring, a pull-down securably engaged with said peripheral portion of the head vellum, vertically acting means connected at its upper end to the pull-down ring, an annular housing spaced below the head vellum and spaced from the side wall of the casing, said housing having open upper and lower ends and inner and outer side walls, an annular vibrator ring positioned within the housing for vertical movements relative thereto, the tone ring being fixed to the upper end of the vibrator ring, said casing sidewall terminating at its lower end in an upwardly opening concave portion which merges into an upwardly extending portion which is fixed to the inner wall of the annular housing, the side walls of the housing having lateral flanges at their lower ends, an inflatable and resilient annular tubular vellum positioned beneath the annular housing and spacedly within said concave casing side wall portion, said annular vellum being partially engaged at its top with said annular flanges and with the lower edge of the vibrator ring, said pull-down means being operatively engaged with the bottom of and secured to the annular vellum, a ncek having an inner end abutting the outer side of the outer side wall of the annular housing, said housing side walls, the casing side wall, the vibrator ring, and said tangential portion of the casing being formed with aligned openings, a rod extending diametrically across the casing and through said openings and secured to outside housing side wall at the end thereof remote from the neck, said rod being out of contact with the vibrator ring, said rod having a terminal extending out of the casing and secured in the neck, a tail-piece bearing against the outer surface of the annular housing and secured thereto and to the rod, said tail-piece having an upstanding arm spaced from the casing side wall and the housing and merging into an inwardly extending terminal spaced from the housing side wall and the hold-down ring, a bridge bearing upon the head vellum, and strings secured to the neck and the terminal of the tail-piece and bearing upon the bridge, said tail-piece having an opening passing the rod, and a first nut threaded on the rod against the outer side of the tail-piece, and a second nut threaded on the rod against the inner surface of the inner side wall of the annular housing.

References Cited by the Examiner
UNITED STATES PATENTS 635,192  10/1899  Sapp _____ 84—411

FOREIGN PATENTS 9,812  1900  Great Britain.

LEO SMILOW, *Primary Examiner.*